UNITED STATES PATENT OFFICE.

THOMAS RIGBY, OF DUMFRIES, SCOTLAND, AND NILS TESTRUP, OF LONDON, ENGLAND, ASSIGNORS TO WETCARBONIZING LIMITED, OF LONDON, ENGLAND.

PROCESS FOR THE UTILIZATION OF PEAT.

1,144,250. Specification of Letters Patent. Patented June 22, 1915.

No Drawing. Application filed November 23, 1912. Serial No. 733,214.

*To all whom it may concern:*

Be it known that we, THOMAS RIGBY, a subject of the King of Great Britain and Ireland, and resident of 61 Loreburn street, Dumfries, Scotland, and NILS TESTRUP, a subject of the King of Great Britain and Ireland, and resident of 3 Dean Farrar street, London, S. W., England, have invented a certain new and useful Improved Process for the Utilization of Peat, of which the following is a specification.

This invention relates to the utilization of peat by gasification of the same in gas producers adapted for by-product recovery, see for instance the co-pending application Ser. No. 712,745, filed August 1st, 1912. Before peat can be utilized in such a way, however, it is necessary to remove water from it and this has usually been attempted by drainage and subsequent air drying on the bog or in drying sheds. Again, proposals have been made first to decompose water-binding matters which the peat contains, and then to dewater the product by filter-pressing.

It has been proposed to effect drying of peat artificially as by exposing peat after drainage to products of combustion but such processes have never found practical application owing to the large amount of heat required to effect drying in relation to the calorific value of the dried peat fuel obtained.

The object of the present invention is to provide an improved process capable of application on a large scale for utilizing peat by gasification in by product recovery gas producers.

The present invention consists in removing such a portion of the water of the peat as renders it suitable for disintegration, then reducing it to a finely divided condition and exposing it for the desired period in this condition in hot products of combustion of gases generated in by-product recovery gas producers to which some or all of the treated material is supplied. The drying is preferably carried out by passing the products of combustion through a duct leading to cyclone separators or other like means into which duct the disintegrated peat is introduced, the rate of the flow of the gases, the length of the duct and other factors being adjusted so that when the material which is carried by the gases reaches the separating means it has the desired dryness. The treated material is consolidated into cakes or briquets for gasification.

By proceeding according to the present invention regular working is readily obtained as no difficulty arises in obtaining weather or other conditions such as will enable the preliminary drying necessary (say to 70% water content) to be uniformly obtained. Moreover the fuel obtained does not require the use in the producer of so high a blast pressure and produces less dust and consequent fouling of the tar and loss of by-products, principally ammonia, than fuel obtained by air drying.

In carrying the invention into effect in the preferred form the drying installation is adapted to reduce the water content of a part of the material to an intermediate value only say to a water content of 50% and to dry the remainder practically completely the former quantity being consolidated into cake form and the latter briqueted in any usual way, the proportions so treated being chosen to give the desired average moisture content in the fuel when they are mixed for charging into the producer. Such a mixed charge gives a mechanically strong fire and great freedom from dust in the gases. This method may be carried out by dividing the drying into two distinct stages, the hottest products of combustion effecting the second stage of drying and the waste gases from this stage being utilized to effect the first stage of the drying. Thus the gases which may be wholly or in part exhaust gases from internal combustion engines consuming producer gas and used to supply power or to generate electricity or may be obtained by combustion under any other suitable condition of the producer gas are introduced into a flue when the finely divided peat already to some extent dried in the first stage, is added as by a rotary pocket valve, the solid being conveyed by the gases to a series of cyclone separators where it is removed and the waste gases still containing a certain amount of their heat have added to them the raw material (*i. e.*, the peat which simply by pressing, draining or air drying had its water slightly reduced). This material is now carried by the gases to a further series of separators where it is thrown down and partly supplied to the rotary valve before referred to. The gases are passed through washing towers or other devices for recovery of the remaining dust carried by the gases. In this way fuel more of briquet form and of greater strength than that usual with air dried blocks is obtained, and it is for this reason to a great extent that increased ammonia yields and freedom from dust are obtainable.

Either in consolidating the partly dried material or in briqueting the more completely dried peat any suitable binder such as tar or pitch (*e. g.*, from the by-product plant) may be used.

Having now described our invention, what we claim as new and desire to secure by Letters Patent is:—

1. Method of utilizing peat according to which the latter is partially dried, then at least in part pulverized, dried further as a powder suspended in hot products of combustion, and thereupon gasified to yield gas from which the products required for drying are ultimately obtained.

2. Method of utilizing peat according to which the latter is partially dried, then at least in part pulverized, further dried as a powder suspended in hot products of combustion, and thereupon gasified to yield gas which, after being treated for the recovery of by-products, is utilized to generate power and thereby supply the hot products required in drying the peat.

3. Method of utilizing peat according to which the latter is filter pressed, then at least in part pulverized, dried further as powder suspended in hot products of combustion, consolidated and thereupon gasified to yield gas from which the products required for drying are ultimately obtained.

4. Method of utilizing peat according to which the latter is filter pressed, then at least in part pulverized, further dried as a powder suspended in hot products of combustion, consolidated and thereupon gasified to yield gas which, after being treated for the recovery of by-products, is utilized to generate power and thereby supply the hot products required in drying the peat.

5. Method of utilizing peat in which the peat is filter pressed, a part thereof then pulverized, and the powder so obtained dried by suspension in hot products of combustion, then briqueted, and along with another part of the filter pressed peat is gasified to yield gas from which the products of combustion required for drying the peat are ultimately obtained.

6. Method of utilizing peat in which the peat is filter pressed, a part thereof then pulverized, and the powder so obtained dried by suspension in hot products of combustion, then briqueted, and along with another part of the filter pressed peat is gasified to yield gas which, after being treated for the recovery of ammonia, is utilized to generate power and thereby yield the hot products of combustion required for drying the peat.

7. Method of utilizing peat according to which the latter is filter pressed, then at least a part thereof pulverized and further dried by being suspended as powder in hot products of combustion which, after effecting the final drying of the powder are utilized to dry the moister powder, whereupon the powder is consolidated and gasified to yield gas from which the products necessary for drying the peat are ultimately obtained.

8. Method of utilizing peat, in which the peat is filter pressed, a part thereof pulverized and the powder so obtained dried by suspension in a current of hot products of combustion which, after having been cooled in effecting the final drying of the powder, are further utilized to effect drying of the moister powder, whereupon the powder is briqueted, and along with another part of the filter pressed peat is gasified to yield gas which, after being treated for the recovery of by-products, is utilized to generate power and thereby yield the hot products of combustion required for drying the peat.

9. Method of utilizing peat according to which the latter is partially dried by filter pressing, then pulverized, further dried as a powder suspended in hot products of combustion, and thereupon gasified to yield gas which, after being treated for the recovery of ammonia, is utilized to generate power and thereby supply the hot products required in drying the peat.

10. Method of utilizing peat according to which at least part of the latter is partially dewatered, then pulverized, further dewatered as a powder suspended in hot products of combustion and thereupon burned to yield hot products of combustion for the dewatering.

In testimony whereof we have signed our names to this specification in the presence of two subscribing witnesses.

THOMAS RIGBY.
NILS TESTRUP.

Witnesses to signature of Thomas Rigby:
BERTRAM H. MATTHEWS,
ANDREW H. SKILLING.

Witnesses to signature of Nils Testrup:
BERTRAM H. MATTHEWS,
E. C. WALKER.

Copies of this patent may be obtained for five cents each, by addressing the "Commissioner of Patents, Washington, D. C."